US010755599B2

(12) United States Patent
Schilleci (10) Patent No.: US 10,755,599 B2
(45) Date of Patent: Aug. 25, 2020

(54) APPARATUS AND METHOD FOR ASSESSING TOOTH-SENSITIVITY TREATMENT BY ORAL-CARE PRODUCT

(71) Applicant: The Procter & Gamble Company, Cincinnati, OH (US)

(72) Inventor: John Giuseppe Schilleci, Caracas (VE)

(73) Assignee: The Procter & Gamble Company, Cincinnati, OH (US)

(*) Notice: Subject to any disclaimer, the term of this patent is extended or adjusted under 35 U.S.C. 154(b) by 409 days.

(21) Appl. No.: 15/634,877

(22) Filed: Jun. 27, 2017

(65) Prior Publication Data

US 2017/0372638 A1    Dec. 28, 2017

Related U.S. Application Data

(60) Provisional application No. 62/355,178, filed on Jun. 27, 2016.

(51) Int. Cl.
*G09B 23/28* (2006.01)
(52) U.S. Cl.
CPC .................. *G09B 23/283* (2013.01)
(58) Field of Classification Search
CPC .................................. G09B 23/283
USPC ........................................ 434/263
See application file for complete search history.

(56) References Cited

U.S. PATENT DOCUMENTS

| 3,828,770 | A | * | 8/1974 | Kuris ...................... | A61C 1/07 601/142 |
| 4,435,163 | A | * | 3/1984 | Schmitt ................ | G09B 23/283 434/263 |
| 4,788,734 | A | * | 12/1988 | Bauer ................ | A46B 15/0002 15/105 |
| 4,990,327 | A | * | 2/1991 | Neirinckx ................ | A61K 8/19 424/52 |

(Continued)

FOREIGN PATENT DOCUMENTS

| WO | WO2007108030 | 9/2007 |
| WO | WO2014170065 | 10/2014 |

OTHER PUBLICATIONS http://www.colgateprofessional.com/professional-education/videos/pro-argin-technology-mode-of-action.

(Continued)

*Primary Examiner* — Xuan M Thai
*Assistant Examiner* — Sadaruz Zaman
(74) *Attorney, Agent, or Firm* — Parker D. McCrary; Vladimir Vitenberg (57) ABSTRACT

A portable tooth-sensitivity demonstration apparatus and a process. The apparatus includes a main unit with a top cover having at least one tooth station thereon; an electrical circuit, a sensitivity indicator, and an on/off switch. A sensor in the tooth station is part of the electrical circuit to activate a response by the sensitivity indicator. A water-permeable tooth piece, treated with an oral-care product, is placed into the tooth station, and a few drops of water are deposited on top of the tooth piece. Lack of response from the sensitivity (Continued)

indicator shows an absence of sensitivity and hence effectiveness of the oral-care product, while a response from the sensitivity indicator shows existing sensitivity and thus failure of the oral-care product to seal the tooth piece. In an apparatus having multiple tooth stations, different oral-care products can be assessed simultaneously and side-by-side.

11 Claims, 7 Drawing Sheets

(56) References Cited

U.S. PATENT DOCUMENTS

| | | | | |
|---|---|---|---|---|
| 6,786,732 | B2* | 9/2004 | Savill | A46B 15/0002 |
| | | | | 434/263 |
| 6,926,532 | B1* | 8/2005 | Brattesani | G09B 19/0084 |
| | | | | 434/263 |
| 6,969,258 | B1* | 11/2005 | Shaygan | G09B 23/283 |
| | | | | 434/263 |
| 8,425,233 | B2* | 4/2013 | Kadobayashi | G09B 23/283 |
| | | | | 264/16 |
| 2005/0129453 | A1* | 6/2005 | Bravo-Loubriel | A46B 5/0091 |
| | | | | 401/188 R |
| 2011/0136090 | A1* | 6/2011 | Kazemi | G09B 23/283 |
| | | | | 434/263 |
| 2015/0330966 | A1* | 11/2015 | Drake | G01N 33/4833 |
| | | | | 435/29 |
| 2016/0202137 | A1* | 7/2016 | Shi | G01M 3/16 |
| | | | | 73/40 |
| 2016/0240105 | A1 | 8/2016 | Utgikar et al. | |

OTHER PUBLICATIONS

International Search Report with Written opinion, dated Sep. 1, 2017, 12 pages.

Martin Addy; "Dentine hypersensitivity: new perspectives on an old problem"; International Dental Journal (200) 52, 367-375.

* cited by examiner

INTRODUCING PRO-ARGIN™ TECHNOLOGY FOR SENSITIVITY RELIEF

CONTAIN ARGININE, AN AMINO ACID NATURALLY FOUND IN SALIVA, AND CALCIUM CARBONATE

Research has revealed arginine provides naturally protective oral health benefits.[5,6] Colgate has harnessed this knowledge and added the Pro-Argin™ technology, consisting of arginine and calcium carbonate, to oral care products to deliver proven anti-sensitivity benefits.

Arginine

Arginine, calcium carbonate and saliva

Arginine enters and helps plug tubules

PRO-ARGIN™ TECHNOLOGY WORKS BY PLUGGING TUBULES

Latest research suggests that at physiological pH; arginine and calcium carbonate interact and bind to the negatively charged dentine surface to form a calcium rich layer on the dentin surface and in the dentin tubules to plug and seal them.

Tubules are sealed

HOW PRO-ARGIN™ TECHNOLOGY BLOCKS PAIN

Pro-Argin™ Technology triggers occlusion of the dentin tubules that remains intact even after exposure to acids, preventing transmission of pain-producing stimuli.

APPARATUS AND METHOD FOR ASSESSING TOOTH-SENSITIVITY TREATMENT BY ORAL-CARE PRODUCT

FIELD OF THE INVENTION

The invention is directed to an apparatus and a method for assessing sensitivity of teeth treated with an oral-care product that blocks dentin tubules.

BACKGROUND OF THE INVENTION

Tooth sensitivity is a well-known and uncomfortable condition affecting many individuals. It is also known as dentin hypersensitivity (or dentin sensitivity) and is caused by erosion of the tooth enamel exposing the hollow dentin tubules, thereby allowing external stimuli, such as, e.g., heat, cold, chemicals, and/or physical and mechanical pressure such as one caused by brushing. These stimuli can irritate the nerves located in the pulp cavity through the open dentin tubules, which results in painful or irritating sensation.

Some reports demonstrate that dentin hypersensitivity affects up to 57% of patients worldwide (Addy M., *Int. Dent. J.*, 2002: 52, 367-375). Therefore, the oral-care industry has developed a number of oral-care products for treating this condition. Common approaches to communicate the treatment effectiveness of these products, whether via live in-store presentation, on-line, print or TV advertisement, rely on the use of demonstration tools such as, e.g., animated videos (see, http://www.colgateprofessional.com/professional-education/videos/pro-argin-technology-mode-of-action) or magnified illustrations. These tools, however, may not be as effective as expected. Some consumers tend to regard videos and images with skepticism because they perceive them not as "real" representation of what is occurring—but as visually enhanced depictions to favor the product or products being advertised over those of the competition. Moreover, blown-up images are bulky and require a lot of space for display. They are also difficult to transport and are prone to being damaged during transportation. Lastly, while animated videos could show mode of action, they cannot be readily used to measure and/or demonstrate treatment efficacy of products, particularly in real time.

Therefore, the need exists for improved methods and apparatuses for assessing and demonstrating, in real time, the effectiveness of the tooth-sensitivity treatment with an oral-care product that is designed to seal the dentin tubules thereby obstructing external stimuli causing sensitivity. There is also a need for a compact tooth-sensitivity testing apparatus that is easily transportable to various sites to be used in demonstrations to consumers.

SUMMARY OF THE INVENTION

In one aspect, the present invention is directed to an apparatus for assessing treatment effectiveness of tooth sensitivity, specifically dentin hypersensitivity, with an oral-care product, wherein the tooth sensitivity is reduced or eliminated due to the oral-care product's ability to occlude the dentin tubules, thereby obstructing external stimuli from penetrating the tubules and reaching the nerves located in the pulp cavity.

In one exemplary embodiment, a portable tooth-sensitivity demonstration apparatus comprises a main unit comprising a housing that includes a top cover having an interior surface and an exterior surface, and a bottom cover opposite to the top cover. The top cover comprises at least one tooth station disposed on the exterior surface of the top cover. The apparatus further has an electrical circuit including a power source, a sensitivity indicator, and an ON/OFF switch; at least one sensor disposed in the at least one tooth station and incorporated into the electrical circuit to initiate at least one response by the sensitivity indicator; and at least one water-permeable tooth piece configured to be disposed in the tooth station. The tooth piece has a top surface, a bottom surface opposite to the top surface, and an average thickness between the top and bottom surfaces.

In another exemplary embodiment, a portable tooth-sensitivity demonstration apparatus comprises a housing including a top cover having an interior surface and an exterior surface, and a bottom cover opposite to the top cover, wherein the top cover comprises at least two substantially identical tooth stations, including a first tooth station and a second tooth station, disposed at a distance from one another on the exterior surface of the top cover; an electrical circuit including a power source, a sensitivity indicator, and an ON/OFF switch; a first sensor disposed in the first tooth station and incorporated into the electrical circuit to activate a first response by the sensitivity indicator; a second sensor disposed in the second tooth station and incorporated into the electrical circuit to activate a second response by the sensitivity indicator; and at least two identical water-permeable tooth pieces comprising a first tooth piece and a second tooth piece, each of the tooth pieces being configured to be disposed in any of the tooth stations.

The sensitivity indicator can comprise at least one LED configured to emit light into at least one of a first area during the first response and into a second area during the second response, wherein the first area is visually associated with the first tooth piece disposed in the first tooth station and the second area is visually associated with the second tooth piece disposed in the second tooth station. The tooth pieces can be conveniently made of plaster. In one embodiment, the first area includes the first tooth station and the second area includes the second tooth station. The at least one LED can be disposed inside the main body. Each of the first tooth station and the second tooth station can be structured and configured as a depression in the exterior surface of the top cover. Each of the first and second tooth stations may have a bottom structured and configured to let the emitted light be visible through at least a portion of the housing. To this end, each of the first and second tooth stations can have the bottom that is, at least in part, transparent or translucent.

The sensitivity indicator may comprise a sound generator configured to produce a sound during each of the first response and the second response. The sound may comprise music, a siren-like sound, a human-voice exclamation commonly associated with pain or discomfort, a short message, or any combination thereof.

In another aspect, the disclosure provides a method of assessing whether an oral-care product is an effective treatment of tooth sensitivity, specifically dentin hypersensitivity—and/or whether one oral-care product is more efficient than the other in treating the tooth-sensitivity condition, wherein the tooth sensitivity is reduced or eliminated due to the oral-care product's ability to occlude the dentin tubules, thereby obstructing external stimuli from penetrating the tubules and reaching the nerves located in the pulp cavity.

The method comprises the steps of providing the apparatus of claim 1; subjecting the at least one tooth piece to a treatment with an oral-care product; placing the tooth piece in the tooth station; depositing from two to six drops of water on the top surface of the tooth piece; and observing effects of the treatment of the tooth with the oral-care product, wherein an absence of the at least one response from the sensitivity indicator indicates an absence of or decreased sensitivity, while an activation of the at least one response from the sensitivity indicator indicates remaining sensitivity.

The step of subjecting the tooth piece to a treatment with an oral-care product may comprise brushing, for a first period of time, the tooth piece with a conventional ADA-approved toothbrush using from about 0.6 gram to about 1 gram of an oral-care product thereby distributing the oral-care product throughout the entire body of the tooth piece substantially evenly; rinsing, for a second period of time, the tooth piece having the oral-care product thereon with water; and drying, for a third period of time, the tooth piece until all surfaces of the tooth piece are substantially dry. The first period of time can be from about 20 seconds to about 120 seconds. The second period of time can be from about 10 seconds to about 20 seconds. The third period of time can be from about 4 seconds to about 10 seconds.

These and other features of the present invention will become apparent to one skilled in the art upon review of the following detailed description when taken in conjunction with the appended claims, the scope of which should not be understood as limited to the specific devices, methods, conditions, and parameters described herein. Nor should the terminology used herein to describe particular exemplary embodiments be understood to be limiting to the claimed invention.

BRIEF DESCRIPTION OF THE DRAWINGS

While the specification concludes with claims particularly pointing out and distinctly claiming the invention, the invention will be better understood from the following description of the accompanying figures in which like reference numerals identify like elements, and wherein:

DETAILED DESCRIPTION OF THE INVENTION

As used herein, the following terms have the following meanings.

The singular forms "a," "an," and "the" include the plural. Any of the so-called "open" terms "comprising," "having," "containing," and "including" means that other steps, ingredients, elements, etc. that do not adversely affect the end result can be added. Each of these terms encompasses the terms "consisting of" and "consisting essentially of."

The term "consumers" refers to the customers who purchase the product, users of the products, people who test the product for any reason, and the store owners or managers who decide whether to stock their shelves with the product.

The term "control" means a sample not incorporating the oral-care product of interest. Suitable controls include a positive control provided by a known desensitizing oral-care product and a negative control such as inert compounds (i.e., compounds known not to affect tooth sensitivity) or no compounds at all being used.

The term "oral-care product" refers to a product that in the ordinary course of usage is not intentionally swallowed for purposes of systemic administration of particular therapeutic agents, but is rather retained in the oral cavity for a time sufficient to contact substantially all of the dental surfaces (i.e., teeth) and/or oral tissues for treatment of tooth sensitivity. The oral-care product may be in various forms, including, e.g., toothpaste, dentifrice, tooth gel, subgingival gel, mouth rinse, mousse, foam, sensitivity strip, or denture product. The term "oral-care product" may also include treatment regimens where these aforementioned exemplary compositions may be applied to teeth via an implement, such as a toothbrush or the like. The term "oral-care product" may also include individual oral-care actives.

Unless otherwise specifically stated, the components, compositions, and equipment described herein are believed to be widely available from multiple suppliers and sources around the world.

Figure 1:
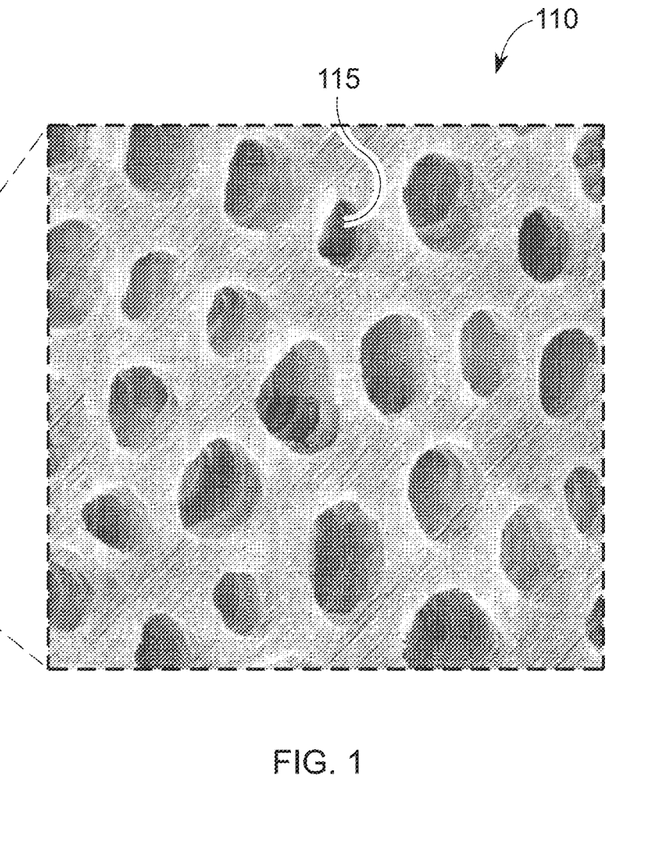
FIG. 1 schematically shows a cross-sectional view of a conventional human tooth.
Figure 1A:
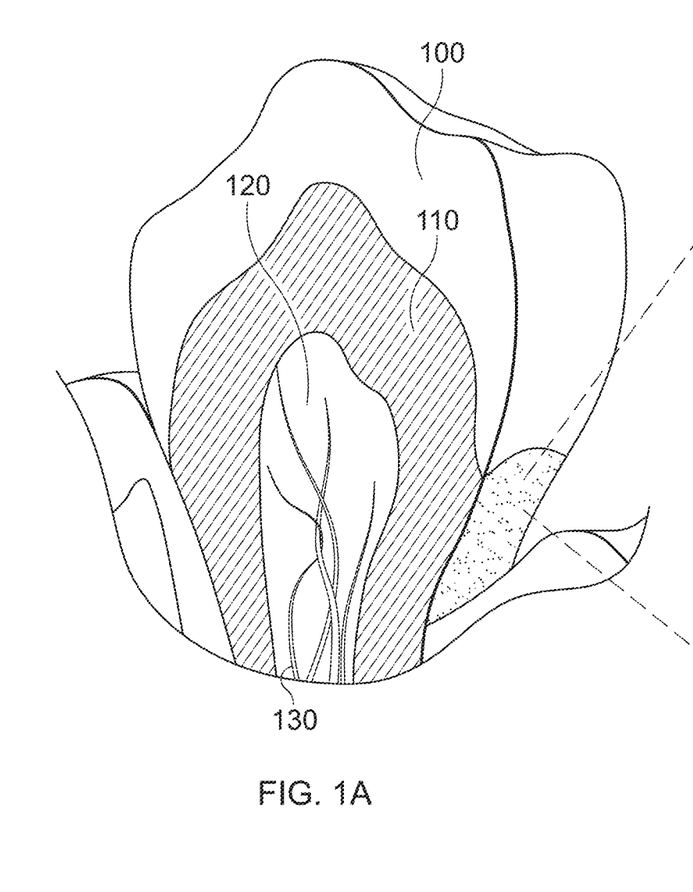
FIG. 1A shows an enlarged view of a surface of the tooth shown in FIG. 1.
Figure 2:
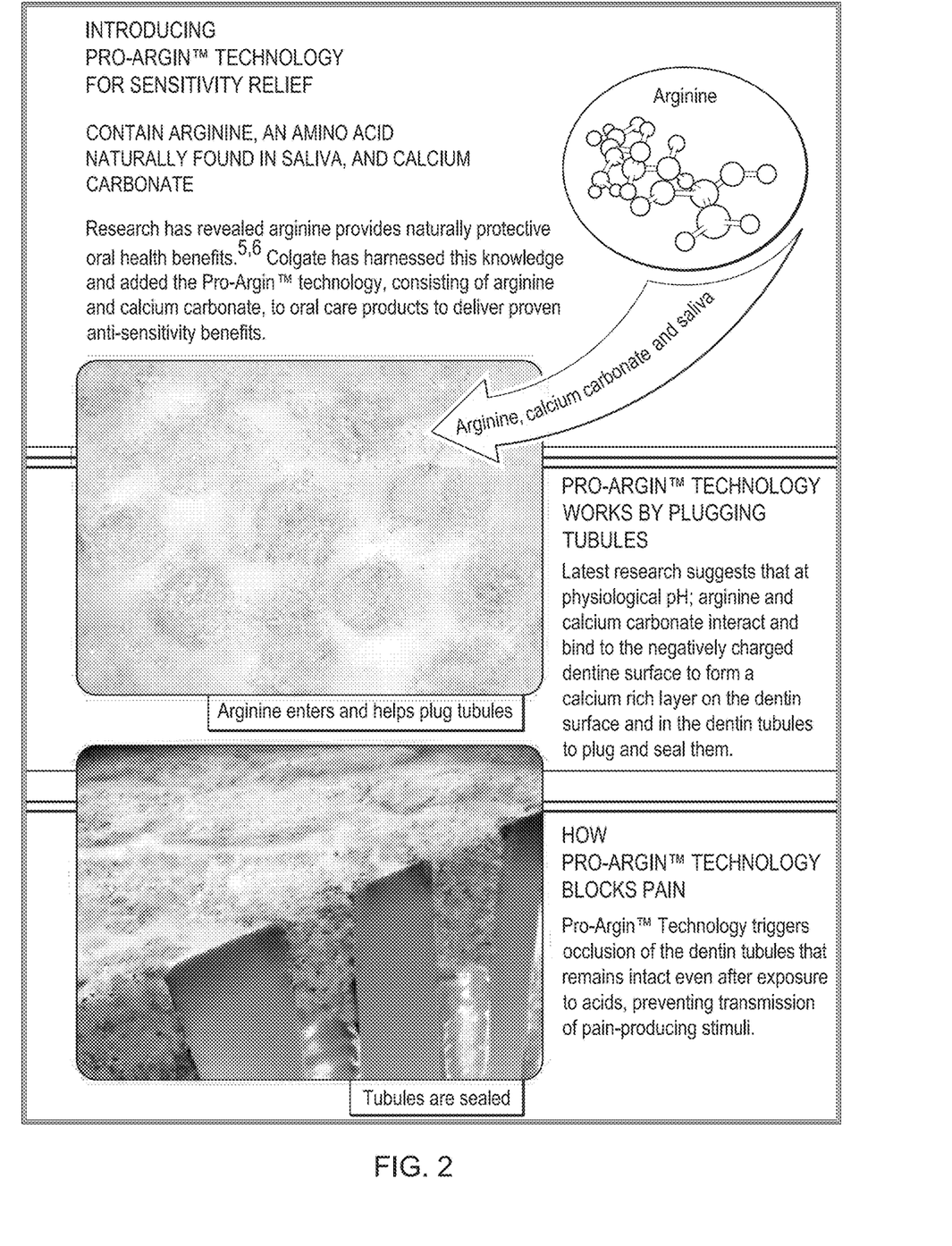
FIG. 2 shows a prior-art advertisement using computer-illustrated SEM micrograph taken of a dentin specimen after use with a conventional desensitizing toothpaste.

FIGS. 1 and 1A show a schematic cross-sectional view of a conventional human tooth, including enamel 100, dentin 110, and pulp cavity 120, which are arranged in an inward order. Dentin 110 comprises hydroxyapatite and has a number of fine canals called dentin tubules 115 connecting the enamel 100 and the pulp cavity 120. The dentin tubules 115 are generally about two microns in diameter at their base and somewhat narrower at their periphery. Pulp cavity 120 has therein a nerve 130, blood vessels and lymphatic vessels. Dentin hypersensitivity (also known as dentin sensitivity) is a common and uncomfortable condition caused by erosion of the enamel 100 that leads to the hollow dentin tubules 115 being exposed to external stimuli, such as, e.g., heat, cold, chemicals, and/or physical and mechanical pressure, including that caused by brushing. These stimuli can irritate the nerves 130 through the open dentin tubules 115, which commonly results in the sensation of pain or discomfort.

The present disclosure is directed to an apparatus and a method for demonstrating and assessing effectiveness of an oral-care product for treatment of tooth sensitivity, and specifically dentin hypersensitivity, wherein the tooth sensitivity is reduced or eliminated due to the oral-care product's ability to occlude the dentin tubules, thereby obstructing external stimuli from penetrating the tubules and reaching the nerves located in the pulp cavity. The present disclosure can also be useful to demonstrate and assess treatment effectiveness of an oral-care product for other types of dental conditions or diseases such as enamel erosion, gingival recession (i.e., gum recession), chronic periodontitis (i.e., gum disease), acid erosion (e.g., related to gastroesophageal reflux disease, bulimia or excessive consumption of acidic foods and drinks), cervical tooth wear, tooth attrition (i.e., from bruxism) and the like. The present disclosure also provides an apparatus and a method for comparing and demonstrating, in real time, effects of tooth-sensitivity treatment by one oral-care product versus another oral-care product.

Apparatus

An apparatus 10 of the disclosure is a convenient and effective communication tool that provides an easy way for a consumer, having no professional background or special knowledge, to understand the tooth-sensitivity phenomenon and how this condition can be effectively prevented or alleviated by using an oral-care product. In addition, by using the apparatus and the method of the disclosure, one can readily assess effectiveness of a tooth-sensitivity treatment by one oral-care product versus another oral-care product, wherein the treatment comprises sealing of the dentin tubules.

The apparatus 10 can be of any suitable dimensions. In one embodiment, the apparatus 10 is portable enough to be easily transported to different sites and conveniently fitted into available display space. For example, referring to the embodiment illustrated in FIG. 3, a length of the apparatus can be from about 150 mm to about 250 mm, and more specifically from about 195 mm to about 226 mm; a width can be from about 70 mm to about 130 mm, and more specifically from about 113 mm to about 116 mm; and a height can be from about 40 mm to about 80 mm, and more specifically from about 60 mm to about 62 mm. The smaller size is advantageous for travelling, particularly air travelling, where luggage space is limited and the cost for additional cargo space can be significant. Such a small-size model would also be beneficial for dentist offices where available space is also limited. The apparatus 10 can be manufactured to be easily disassembled, for ease of transport, and re-assembled upon arrival to the site. Other embodiments of the apparatus 10 are also contemplated, of course, including relatively large models, which can be used for big-scale presentations designed for large audience (e.g., at professional seminars, presentations, and the like).

The apparatus 10 works by the inward flow of a liquid, such as water, simulating an external stimuli, through an imitation of a human tooth ("tooth piece"), resulting in a visual signal, e.g., lights illumination (such as flashing) to mimic or symbolically represent tooth nerve excitation, and/or an auditory signal, e.g., sounds typically associated with pain or discomfort response (such as, e.g., an exclamation "ouch!" and/or "it's painful!" and the like).

Figure 3:
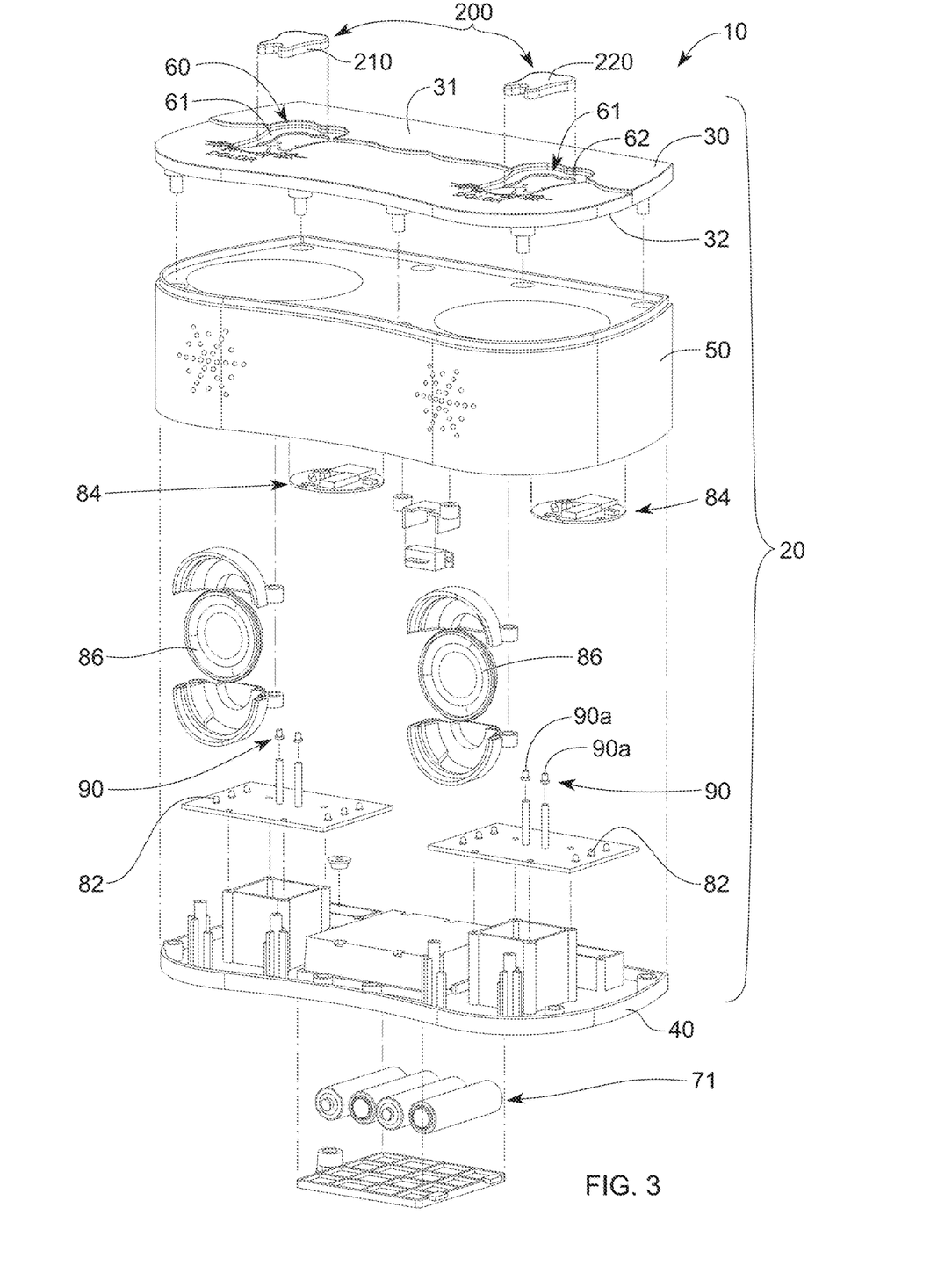
FIG. 3 shows an axonometric view of an exemplary embodiment of a disassembled apparatus of the invention, wherein the apparatus has two tooth stations.
Figure 4:
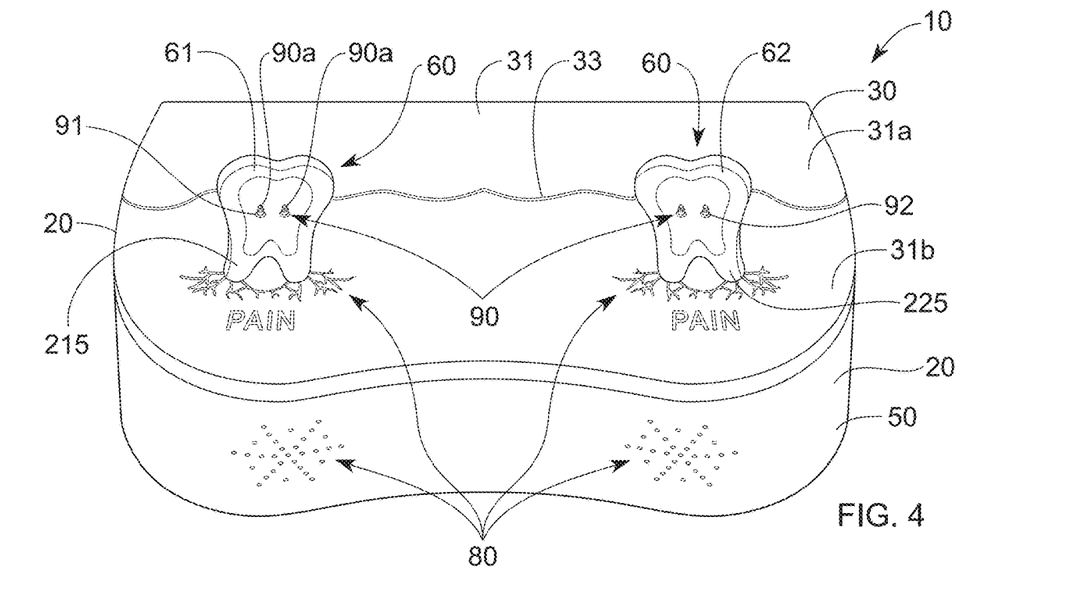
FIG. 4 shows an axonometric view of an exemplary embodiment of an assembled apparatus of the invention.

FIGS. 3 and 4 show an embodiment of the apparatus 10 configured for comparing and demonstrating, simultaneously and in real time, effects of tooth-sensitivity treatment by one oral-care product versus another oral-care product, wherein the sensitivity treatment comprises mechanical occlusion of the dentil tubules. The apparatus 10 shown is portable and self-contained, i.e., it contains all necessary components, including a power source, for functional demonstration. The apparatus 10 comprises a main unit, or housing, 20 including a top cover 30, and a bottom cover 40 opposite to the top 30 cover. In the embodiment of FIGS. 3 and 4, the apparatus 10 has side walls 50 interconnecting the top cover 30 and the bottom cover 40. The side walls may have functional or ornamental openings, e.g., to allow light to shine therethrough and/or to facilitate sound therethrough. Although the main unit 20, shown in several figures herein, comprises side walls 50, one skilled in the art would appreciate that solid continuous side walls may not be required in some embodiments (not shown), in which the top cover 30 and the bottom cover can be interconnected, instead, by a plurality of individual elements, such as, e.g., rods, providing physical integrity to the main unit's overall structure.

The main unit 20 can be made from any suitable materials that are durable enough to hold up to being transported around without being easily damaged. Non-limiting examples include plastic, steel, wood, various light-weight composite materials and combinations thereof. Suitable plastic materials include, without limitation, hard plastics, such, e.g., as polycarbonate, polyethylene (PE), polypropylene (PP), polyvinylchloride (PVC), polyethylene terephthalate (PET), and the like. Further, the apparatus (40) can beneficially be made of stain-proof materials, which makes it easy to clean after each use.

The top cover 30 has an exterior surface 31 and an interior surface 32 opposite to the exterior surface 31. The top cover 30 of the embodiment shown comprises at least two substantially identical tooth stations 60, a first tooth station 61 and a second tooth station 62, disposed at a distance from one another on the exterior surface 32 of the top cover 30. The tooth stations 60 can have any suitable shape, including round, rectangular, elliptical, curved, or any combination thereof. In the embodiment shown, each of the tooth stations 60 has a "tooth" shape (i.e., an image of a tooth shown in its vertical cross-section or side view), which has been conventionally associated with a symbolic representation of a generic human tooth. This or similar shape of the tooth stations 60 can be particularly beneficial because it helps one to visually contextualize the demonstration and assessment of tooth sensitivity using the apparatus 10.

In one embodiment, each of the tooth stations 60 is structured and configured as a depression in the exterior surface 31 of the top cover 30 of the main unit 20. The depression can have a depth of from about 1 mm to about 10 mm, and more specifically from about 2 mm to about 5 mm. Each of the tooth stations 60 has a bottom structured and configured to let light emitted from inside the main unit 20 be visible through at least a portion of the housing 20. In one embodiment, the tooth stations 60 have a bottom that is at least in part translucent or transparent with respect to the light emitted from a light source disposed inside the housing 20. The transparent or translucent portion or portions can colored, painted, tinted, stained, or otherwise decorated. For example, the transparent or translucent portion of the tooth station's bottom can be uniformly tinted red so that a neutral-color light therethrough would appear red as well. In another example, the transparent or translucent portion and/or areas adjacent thereto can be decorated with a colored pattern—or painted otherwise to symbolically represent a tooth or its components, such as, e.g., dentin, pulp cavity, nerves, blood vessels, dentin tubules, and the like. In the exemplary embodiment of FIG. 4, an area of the exterior surface 31 of the top cover 30 adjacent to a portion of the tooth station 60 representing a "root" of the symbolic tooth exhibits a plurality of divergent lines representing nerves as well as an English word "PAIN." In devices intended for non-English-speaking populations the indicia can include a native-language message, easily understandable by the intended audience. These and the like indicia (or any elements thereof) can be structured to be transparent or translucent relative to a surrounding area (which can be opaque), to be accentuated by light through the top cover 30, as is explained herein.

The tooth stations 60 can be formed in the top cover 30 by any method known in the art. For example, the tooth stations 60 of any desired shape can be made on the exterior surface 31 of the top cover 30 by painting, printing, etching, or any other known decorative technique. Alternatively or additionally, the tooth stations 60 can be formed, e.g., by cutting out portions of the top cover 30 wherein each of the cut-out portions has a shape of the desired tooth station 60. Then, an additional layer or layers of material, which can be transparent or translucent, can be securely affixed, e.g., to the interior surface 32 of the top cover 30 to overlap the perimeter of the cut-outs in the top cover 30. The tooth stations 60 can be formed by using at least two layers of material: a first layer having through holes in the shape of the desired tooth stations 60 and a second layer superimposed with the first layer, so that the first layer forms the exterior surface 31 and the second layer forms the interior surface 32 of the top cover 30. The second layer can be at least in part translucent or transparent, wherein the translucent or transparent portion overlaps with the through hole in the shape of the desired tooth stations 60.

In some embodiments, the top cover 30, or at least its exterior surface 31, can be formed by at least two parts 31a, 31b abutting one another along a line symbolically representing a gum line 33 and having different visual attributes, e.g., color, surface texture, optical characteristics, such, e.g., as opacity/translucency/transparency, and any combination thereof, FIG. 4. In other embodiments, a similar effect can be accomplished by decorating, e.g., coloring, the exterior surface 31 or its portion to mimic or symbolically show the gum line 33.

Overall dimensions of the tooth stations 60 can be influenced, among other things, by the size of the apparatus 10, which, in turn, can depend on the scope of the intended demonstration, the anticipated size of the audience, considerations of portability, and other relevant factors. For the embodiment of the apparatus 10 shown in FIGS. 3 and 4, and having the length, width, and height dimensions described above, the suitable tooth station 60 can have a length of from about 25 mm to about 65 mm and a width from about 15 mm to about 55 mm. In one particular embodiment, the tooth station 60 can have a length of about 35-37 mm and a width of about 26-28 mm.

Figure 7:
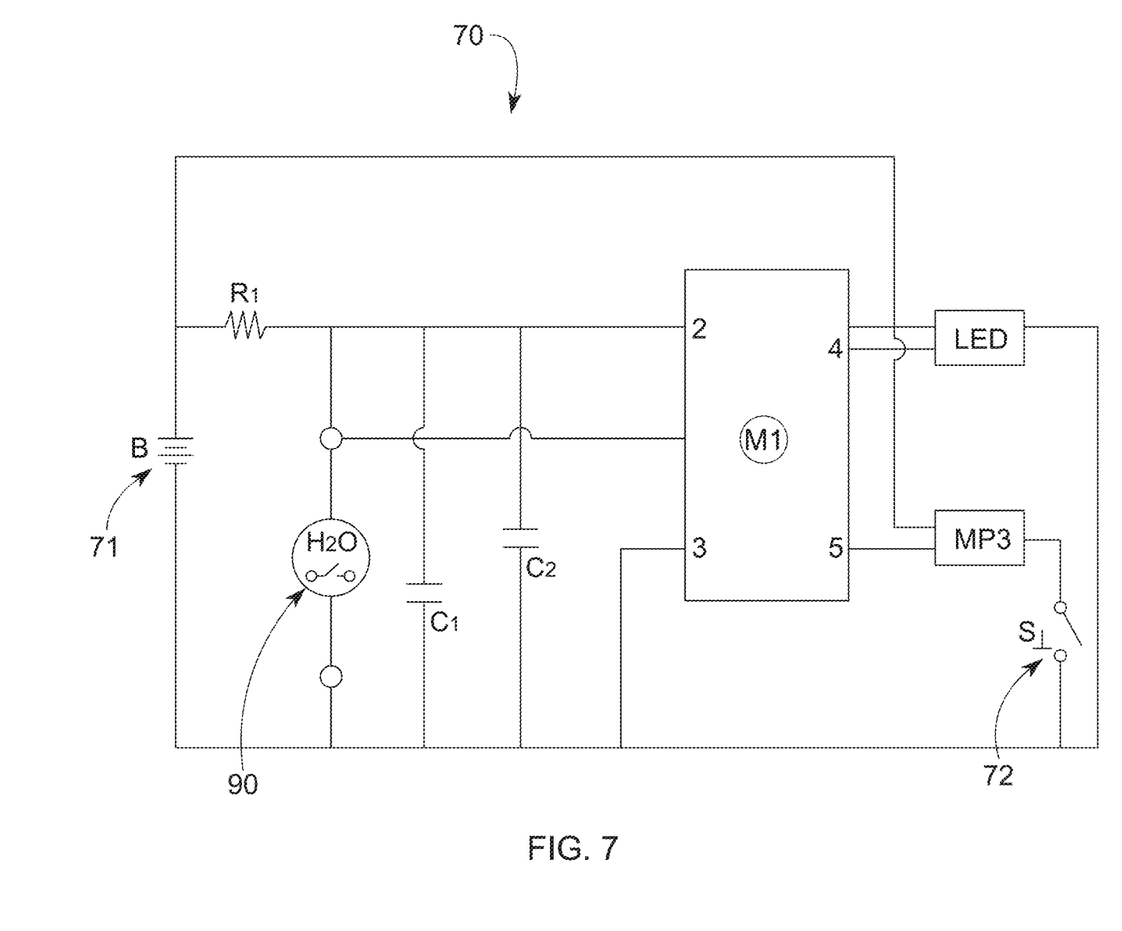
FIG. 7 shows a principal electrical diagram of an exemplary electrical circuit that can be utilized in the apparatus of the invention

The apparatus further has an electrical circuit 70 including a power source 71 and an ON/OFF switch 72 to power the apparatus 10, FIG. 7. The power source 71 can comprise one or more conventional batteries, e.g., AA, AAA, C, and D batteries, either disposable or rechargeable. For the portable apparatus 10, four AA batteries, supplying approximately 4.5-6V, is considered adequate. The ON/OFF switch 72 can be realized in any suitable form, e.g., a manual push button, a two-positional switch, a sliding switch, and any other suitable device known in the art. An embodiment of the apparatus 10 in which electrical power is supplied, via a cable, by a conventional electrical outlet (e.g., 120V) is also contemplated, in which instance an electrical adapter and/or converter can be conventionally utilized.

The apparatus shown in FIG. 3 further comprises a sensitivity indicator 80 and at least two sensors 90 incorporated into the electrical circuit 70: a first sensor 91 and a second sensor 92. The first sensor 91 is disposed in the first tooth station 61 to activate a first response by the sensitivity indicator 80; and the second sensor is disposed in the second tooth station 62 to activate a second response by the sensitivity indicator 80. Any suitable and known in the art sensor can be used in the apparatus 10. For example, each sensor 90 can be conventionally structured as a contact pair that includes two electrical contacts configured to close the electrical circuit 70 upon being electrically connected through an electrically conductive substance, such as water. The two electrical contacts of each sensor 90 can comprise, e.g., conventional metal pins 90a, 90b (FIGS. 3, 4) exposed at the bottom of the tooth station 60. A distance between the two electrical contacts at the bottom of the tooth station 60 can be from about 0.5 mm to about 5 mm, more specifically from about 1 mm to about 3 mm, and even more specifically about 1.3-1.5 mm.

The sensitivity indicator 80 is an element that is structured and configured to produce at least one response upon being activated by the sensor 90. The at least one response may include light, sound, and any combination thereof. The sensitivity indicator 80 may include, e.g., one or several LEDs 82 that can be conveniently disposed inside the main unit 20 and that are configured to illuminate a certain area that can be visible by an operator and/or audience. Such an area can conveniently be adjacent to, or at least partially encompass, an area of the tooth station 60, and particularly the bottom of the tooth station 60. Any suitable mode of operation of the LED or LEDs 82 can be utilized. For example, the LED 82 can be configured to simply emit steady light when activated. Alternatively, the LED or LEDs 82 can be structured and configured to rapidly flash when activated. Additionally or alternatively, the LEDs 82 can be structured and configured to change colors of the light when activated. Suitable optical devices, such as, e.g., lenses, to amplify or direct the light to the desired area, are also contemplated in this disclosure.

In one exemplary embodiment, the LEDs can be structured to start illuminating the tooth station 60 once the switch 72 is in the ON position and the apparatus 10 is powered. The illumination can be had through the bottom of the tooth station 60 (which would appear to be backlit) or otherwise, and can comprise a steady light having a "soothing" color (e.g., white, green, yellow, or blue). In this embodiment, the LEDs can be further structured to change the color to red (either steady or flashing) during the response, once the sensor 90 activates the sensitivity indicator 80. In another exemplary embodiment (shown in the diagram of FIG. 7), the LEDs can be structured to stay OFF until the sensor 90 activates the sensitivity indicator 80, at which moment the LEDs start emitting light, either steady or flashing.

Additionally or alternatively, the at least one response may include sound. To this end, the apparatus 10 may comprises at least one slot for a sound card 84 and/or at least one speaker 86. Any suitable sounds that the audience, taking into consideration the relevant audience's cultural and local traditions and dispositions, commonly associates with symbolic display of warning, discontentment, pain, discomfort, and the like, can be used as an acoustic sensitivity indication. For example, the sound may comprise siren-like sounds, cacophony sounds, music, including percussion, disharmonious or dissonant music, exclamations, such, e.g., as "ouch!" or "it's painful!" and the like—and any combination thereof. The sound may also include a short message, delivered in the predominant language or languages of the audience, e.g., an educational message briefly explaining the tooth sensitivity phenomenon and/or the demonstration being conducted.

Figure 7A:
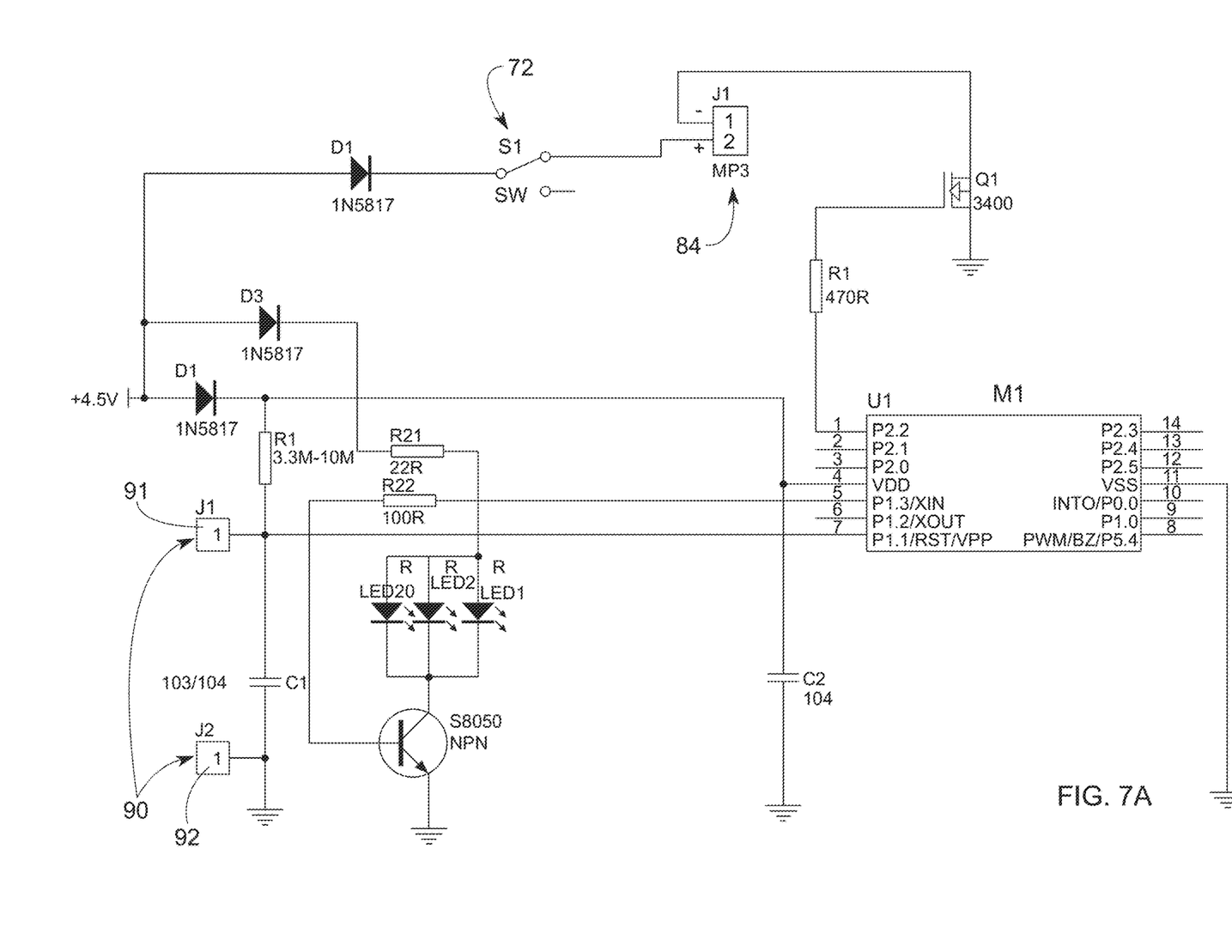
FIG. 7A shows an exemplary embodiment of an electrical circuit that can be utilized in the apparatus of the invention.
Figure 8:
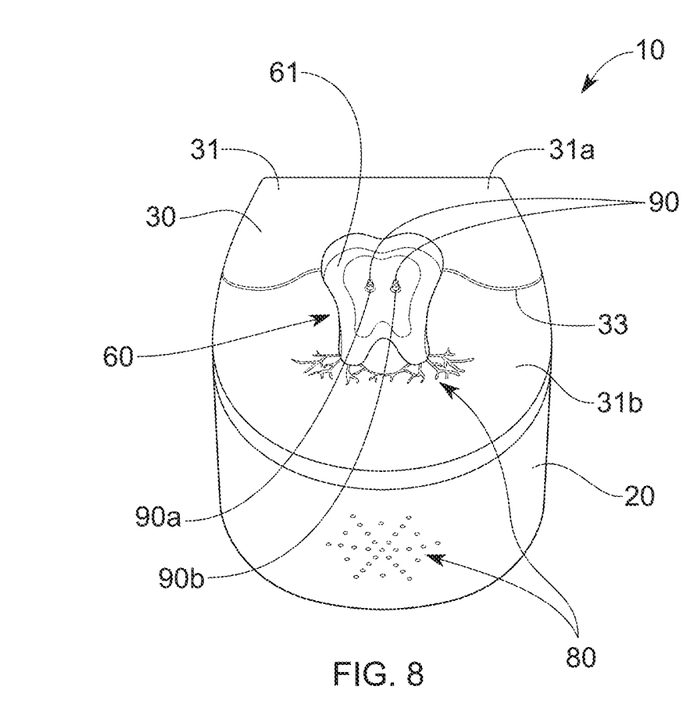
FIG. 8 shows an exemplary embodiment of the apparatus having a single tooth station.

FIGS. 7 and 7A schematically show an embodiment of an electrical circuit 70 that can be utilized in the apparatus 10 having a single tooth station 60, shown in FIG. 8. In the embodiment of FIGS. 7 and 7A, therefore, only a single sensor 90 is shown. One skilled in the art will appreciate that in a multi-station apparatus 10, e.g., the one shown in FIGS. 3 and 4, the entire electrical circuit will comprise more than one configurations identical or similar to that shown in FIGS. 7 and 7A. The electrical circuit 70 shown is configured to detect and visibly and/or audibly indicate conductivity across a water-detecting sensor 90 comprises the following:

A microcontroller M1 powered by a battery B (operating at a voltage of 4.5-6.5V) having three inputs 10, 20, and 30 and two outputs 40 and 50;

A light-emitting system (LED), comprising one or more LEDs and associated electronics to control their on/off stat via a low-level signal from a microcontroller;

A sound-emitting system (MP3) and associated electronics to generate sound from a data file;

A sensor 90 comprising a pair of adjacent contacts that close the circuit when water creates a conducting path between the two contacts;

An ON/OFF switch 72, turning the sound-emitting system on or off;

Capacitors C1 and C2 to isolate power or signals from the ground state, and to soften the signal changes from '1' to '0' and vice versa to the microcontroller;

A resistor R1, to throttle or limit power from a battery to a degree that an '1' (ON) or '0' (OFF) signal can be provided to the microcontroller without damaging the microcontroller.

A ground signal is supplied to the microcontroller via input 3, FIG. 7. The microcontroller takes a small amount of power from the battery to its power input 2 to read a signal from an input 1 to detect if the sensor 90 is open or closed. Normally, the sensor 90 is 'dry' and open, and the signal into input 1 is '1' as the battery is connected through a throttling resistor R1 to this input 1.

When the contacts of the sensor 90 are closed, i.e., when a conducting path between the contacts 91, 92 is created by presence of water, the microcontroller receives signal of '0' to its input 1, as the input 1 becomes connected directly to ground, bypassing the capacitor C1. In this instance, the microcontroller sends a signal via its outputs 4 and 5 to the LED and MP3 systems, respectively. The MP3 system may receive power from the same battery that supplies the microcontroller with power. When the water present in the sensor 90 evaporates or is otherwise removed, the connection of the microcontroller input 1 to ground is broken, and the signal to the input 1 returns to '1'.

One skilled in the art will readily realize that the electrical circuit 70 can comprise conventional electronic components—and that other embodiments of the electrical circuit 70, suitable for the present purposes, as well as other components, can be used without departing from the scope of the invention.

Figure 5:
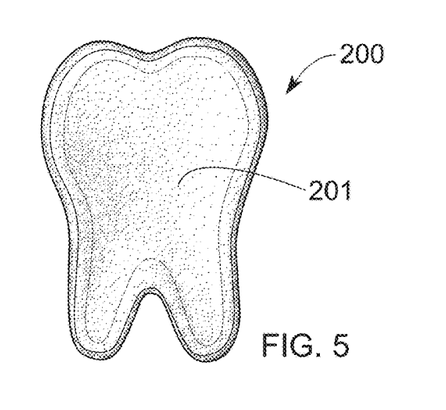
FIG. 5 shows a plan view of an exemplary embodiment of a tooth piece having a symbolic "tooth" shape.
Figure 5A:
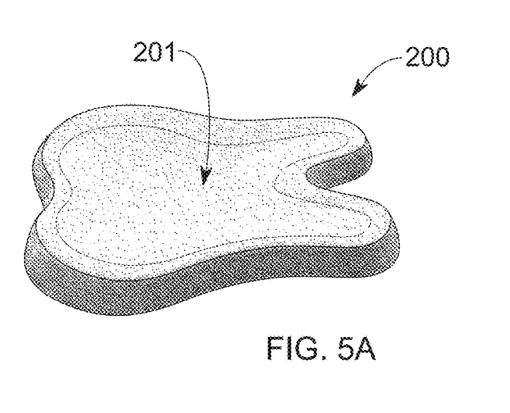
FIG. 5A shows an axonometric view of the tooth piece shown in FIG. 5.

At least two identical water-permeable tooth pieces 200, comprising a first tooth piece 210 and a second tooth piece 220, can be used in the apparatus 10. Each of the tooth pieces 200 has a top surface 201 and a bottom surface 202 opposite to the top surface 201, FIGS. 5, 5A. Each of the tooth pieces 200 can be configured to be disposed in any of the tooth stations 60. It can be beneficial to size the tooth pieces 200 and the tooth stations 60 so that when each of the tooth pieces 200 is placed substantially in the geometric center of the tooth station 60, there is an appreciable peripheral space between the two, i.e., between a perimeter of the tooth station 60 and a perimeter of the tooth piece 200 disposed therein. It can also be beneficial to shape the tooth pieces 200 and the tooth stations 60 identically or similarly, so that the overall shape of the tooth piece 200 is identical or similar to the overall shape of the tooth station 60, wherein an area of the tooth station 60 is greater than that of the tooth piece 200. Then, the tooth piece 200 can be substantially centrally placed in the tooth station 60 so that any portion of the perimeter of the tooth piece 60 is substantially equidistant from a corresponding portion of the perimeter of the tooth station 60, wherein the perimeter of the tooth station 60 is surrounding the perimeter of the tooth piece 200.

For a portable embodiment of the apparatus 10 shown in FIGS. 3 and 4, and having the length, width, and height dimensions described above, including those of the tooth stations 60, the suitable tooth piece 200 can have a length of from about 20 mm to about 50 mm, a width from about 10 mm to about 40 mm, and an average thickness of from about 1 mm to about 5 mm. In one particular embodiment, the tooth piece 200 has a length of about 30 mm, a width of about 21 mm, and an average thickness of about 3 mm. The average thickness of the tooth piece 200 can be measured as an arithmetic-average parameter of the tooth piece's largest thickness at its perimeter and the tooth piece's smallest thickness at its thinnest concave portion (which is described herein below).

The tooth piece 200 can be made from a variety of suitable materials having desired water permeability. Various porous materials, such, e.g., as plaster, hydroxyapatite, calcium phosphate, and calcium carbonate can be used to manufacture the tooth piece 200. Plaster has been found to be particularly beneficial for the present purposes. Plaster is a porous material that contains calcium—and at least for these reasons can be used, for the purposes of this method, to simulate the dentin of the human tooth, which is porous material that includes tubules; it also contains calcium. At least some oral-care products, e.g., toothpastes containing fluoride and/or stannous, typically react with the calcium contained in human teeth thereby creating a protective layer that seals open dentin tubules. We believe that a similar mechanism can be relied upon during a sensitivity assessment and demonstration using the apparatus and the process of the disclosure. The oral-care product may comprise, e.g., oxalic acid and salts thereof, stannous fluoride, sodium fluoride and stannous chloride, arginine (ProArgin), calcium sodium phosphosilicate (NovaMin), strontium chloride (hexahydrate), strontium acetate, calcium carbonate, hydroxyapatite or mixtures thereof.

The tooth piece 200 can be made by any method known in the art. It can, e.g., be easily molded in a mold cavity. One method of making the tooth piece 200 comprises mixing a certain amount, e.g., from about 3 to about 10 gram, of dry plaster (e.g., high-strength plaster stone manufacturer by Dental Continental in Mexico, setting time: 8 minutes, setting expansion: 0.15%) with an equal amount of water, placing the mixture into a mold cavity having the desired shape and dimensions, and letting the mixture dry.

Example of Tooth-Piece Preparation

Figure 6:
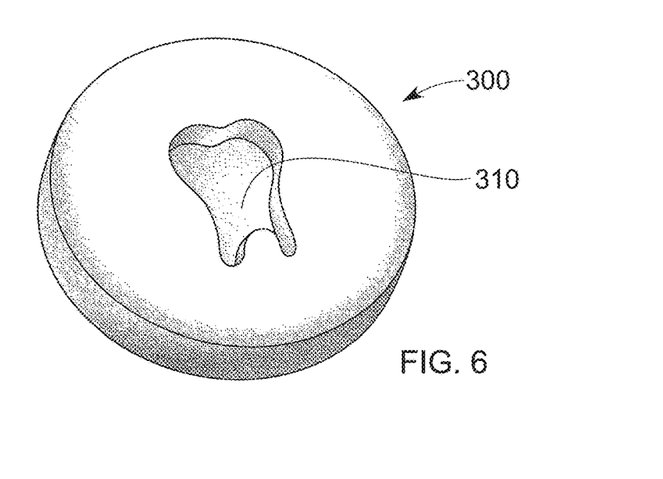
FIG. 6 shows an exemplary embodiment of a mold for making the tooth piece shown in FIG. 5.

In one particular embodiment, about 5 gram of plaster and about 5 mL of distilled water are thoroughly mixed for at least one minute in any suitable dish, to form a substantially homogeneous liquid mixture. Then the liquid mixture is poured into an open mold 300 comprising a mold cavity 310 (FIG. 6) having the desired shape and dimensions, corresponding to those of the tooth piece 200 being made. The mold 300 can be made of any suitable material, e.g., Silipex, as is described herein below in more detail. After the mixture in the mold cavity 310 has dried, which may take, at the room temperature, from about 15 to about 25 minutes, and more specifically about 20 minutes, the resulting substantially solidified mixture having the shape of the tooth piece 200 is taken out of the mold cavity 310 and placed on a hydroscopic substrate such, e.g., as a suitable cloth, paper napkin, or paper towel, to rest for approximately one hour, to cause the tooth piece 200 sufficiently dry.

Example of Making the Tooth-Piece Mold

The mold 300, in which the tooth piece 200 can be formed, can be made in the following essential steps. First, a model of the tooth piece 200 is formed by any method known in the art, including, e.g., 3D-printing technique. The model's material can comprise, e.g., plastic material, such as Polylactic acid (PLA) and Acrylonitrile butadiene styrene (ABS), or any other polymer/material known to be suitable for the purposes of the 3D-printing technique. For portable embodiments of the apparatus 10 shown in FIGS. 3, 4, and 8, the model can have a length of from about 20 mm to about 50 mm, more specifically about 30 mm, a width from about 10 mm to about 40 mm, more specifically about 21 mm, and an average thickness of from about 2 mm to about 5 mm.

Second, the tooth model can be placed in the center of a dish or container having a substantially planar bottom of a suitable size, e.g., approximately twice the size of the model in all directions—and a liquid mold material can be added to cover the entire tooth model. A thickness of the liquid mold material covering the top of the tooth model could beneficially comprise at least the thickness of the tooth model. After the mold material has solidified, it is removed, together with the tooth model, from the dish or container used. Since it is beneficial to have the tooth piece 200 in which at least a central portion of the top surface 201 is concave, the tooth model, too, can have its top surface comprising a concave central portion. When placed in the container, the model should be disposed with its concave surface up—so that the mold cavity 310 will have its bottom having a reversely convex portion. That would ensure that the tooth piece 200 will also have its top surface 201 comprising a concave portion.

Any suitable mold material can be used for the production of the mold 300. Examples include, without limitation, various casting/mold rubbers, plastic molds, silicon molds, etc. One particularly beneficial casting material comprises Siliplex, manufactured by Graffiti Pegamentos in Venezuela. More specifically, Silipex Escultural 1181 Base can be thoroughly mixed with Silipex Escultural 1181 Catalizador until the mixture becomes substantially green. In combination, these two materials, consisting of two key components (a base and a catalyst) work together well for the present purposes. Sculptural SILIPEX 1181 is a highly elastic silicone that has low shrinkage. It makes it easy to handle for the teeth preparation.

In the embodiment of the apparatus 10 comprising at least two tooth stations 61, 62 (intended for at least two tooth pieces 210, 220), the LEDs of the sensitivity indicator 80 can be configured to illuminate separate areas during responses triggered by the respective sensors 91, 92. The LED or LEDs, e.g., can be configured to emit light into a first area 215 during the first response activated by the first sensor 91 and into a second area 225 during the second response activated by the second sensor 92, wherein the first area 215 is visually associated with the first tooth piece 210 disposed in the first tooth station 61 and the second area 225 is visually associated with the second tooth piece 220 disposed in the second tooth station 62.

For example, in the embodiment of the apparatus 10 in which the bottom of the first and second tooth stations 61, 62 are, at least in part, transparent or translucent, the first area 215 may include a translucent or transparent portion of the bottom of the first tooth station 61, and the second area 225 may include a translucent or transparent portion of the bottom of the second tooth station 62, FIG. 4. As is mentioned above, it may be beneficial to size the tooth station 60 and the tooth piece 200 to have a space between the perimeter of the tooth station 60 and the perimeter of the tooth piece 200. Then, the light emitted by the LED(s) during the response can be seen though that space, for the tooth piece 200, being opaque, will block the light from the LED(s). If the entire bottom of the tooth station 60 is transparent or translucent, the light emitted by the LED(s) during the response will surround the entire tooth piece 200, thereby forming a colorful areola around it, symbolizing pain or discomfort in the "sensitive tooth."

FIG. 8 shows an embodiment of the apparatus 10 comprising a single tooth station 60. With the exception of the number of tooth stations 60, sensors 90, and other associated elements, this embodiment has the same principle design as the previously described one. This one-station embodiment may have an advantage of its smaller size relative to the previously described multiple-station embodiment—but a disadvantage of having the ability to test only a single oral-care product at a time. One cannot use this apparatus, having a single tooth station 60, to simultaneously conduct a comparative assessment of two or more different oral-care products or to simultaneously demonstrate their comparative effectiveness (or the lack thereof) on tooth sensitivity. The smaller apparatus, however, can still be used for a comparative demonstration, albeit not a simultaneous, side-by-side one, wherein different oral-care products can be tested in sequence, i.e., one oral-care product after another. This single-station apparatus can also be useful, e.g., to demonstrate benefits of sealing a tooth model's pores (representing the dentin tubules in a tooth) after a treatment with an oral-care product. Such an apparatus can be used, e.g., by dental professionals to educate people about the sensitivity phenomenon and at least one approach of effectively reducing or eliminating it.

Method

The method for assessing and demonstrating sensitivity of teeth treated with at least one oral-care product comprises several steps. First, the apparatus 10, described herein, is provided. For simplicity, the method will be primarily described in the context of the embodiment of the apparatus 10 having a single tooth station 60, shown in FIG. 8. One skilled in the art will readily understand that the apparatus 10 having more than one tooth station 60, e.g., the two-station apparatus 10, shown in FIGS. 3 and 4, two different oral-care products can be tested concurrently side-by-side and in real time, using identical tooth pieces 200, treated with the different oral-care products being assessed and compared. Apparatuses having three, four, and so on tooth stations are also contemplated by this invention.

The tooth piece 200 (e.g., the first tooth piece 210) can be treated with an oral-care product to be tested. The treatment of the tooth piece 200 can include the following steps. The tooth piece 200 can be brushed, for a first period of time, with a conventional ADA-approved toothbrush using from about 0.6 gram to about 1 gram, and more specifically about 0.8 gram, of the oral-care product, such e.g., as a toothpaste. The first period of time can be from about 20 seconds to about 120 seconds. The brushing can be conducted manually and should be conducted fast and strong, with the result of the oral-care product being distributed substantially evenly throughout the entire body of the tooth piece 200.

In one exemplary embodiment of the method, first the top surface 201 of the tooth piece 200 can be brushed for about 8-12 seconds, and more specifically for about 10 seconds;

then one narrow side (including an edge comprising about half of the tooth piece's perimeter) of the tooth piece 200 can be brushed for about 3-7 seconds, and more specifically for about 5 seconds; then the bottom surface 202 of the tooth piece 200 can be brushed for about 8-12 seconds, and more specifically for about 10 seconds; and lastly the other narrow side (an edge comprising another half of the tooth piece's perimeter) of the tooth piece 200 can be brushed for about 3-7 seconds, and more specifically for about 5 seconds. The above sequence can be repeated, so that the entire brushing in the example above lasts from about 44 to about 76 seconds, and more specifically for about 55-65 seconds.

The sequence of the brushing steps and their duration described above are merely exemplary; any other suitable method of brushing of the tooth piece 200 with an oral-care product can be utilized so long as the oral-care product is evenly spread throughout the entire body of the tooth piece 200 and excess of the oral-care product on the surface of the tooth piece 200 is avoided. Of course, in a concurrent side-by-side testing of more than one oral-care product, all samples (e.g., each of the first tooth piece 210 and the second tooth piece 220) should be brushed using the same method, including the toothbrush model used, the amount of the oral-care product applied, the duration of the brushing, the pressure applied during the brushing, and so on.

After the brushing, the tooth piece 200, substantially uniformly covered with the oral-care product, can be rinsed with water for a second period of time. A conventional 250 mL squeeze bottle, having a pressure-jet nozzle diameter from about 2 mm to about 4 mm and a length of from about 80 mm to about 100 mm can be used for rinsing the entire body of the tooth piece 200. The second period of time can be from about 10 seconds to about 20 seconds, and more specifically about 15 seconds. For example, the tooth piece 200 can be rinsed under the maximal pressure allowed by the bottle's jet nozzle at a distance of about 10-30 mm for about 5-10 seconds, and more specifically for 7 seconds, on its top surface 201 and for about 5-10 seconds, and more specifically for about 8 seconds, on its bottom surface 202. Again, in a concurrent side-by-side testing, each of the samples (e.g., the first tooth piece 210 and the second tooth piece 220) should be rinsed using the same method and the same equipment.

The rinsed tooth piece 200 can then be placed on a hydrophilic substrate, such, e.g., as a napkin, a paper towel, or a cloth, to let it dry for a third period of time. The third period of time can be from about 4 to about 10 seconds, and more specifically about 5-7 seconds. The tooth piece 200 can be moved around the substrate to facilitate its drying. In the instance of a concurrent side-by-side testing of more than one oral-care product, a second tooth piece 220 can be treated, as described herein, with a second oral-care product, while the first tooth piece 210 is drying.

When all the surfaces of the tooth piece 200 are sufficiently dry, the tooth piece 200 (or each of the first and second tooth pieces 210, 220) can be placed in the tooth station 60 (or each of the first and second tooth stations 60, 62) of the device 10. It may be beneficial first to place a conventional hydrophilic tissue (e.g., from one to three layers) in the tooth station 60, so that the tooth piece 200 rests on the tissue in the center of the tooth station 60. Examples of the tissues include, without limitation, paper products manufactured by the Procter & Gamble Company, such as, e.g., Charmin® bathroom tissue and Puffs® facial tissue. The tissues can have dimensions of approximately 10-15 mm by 18-25 mm.

Then, from two to six, and more specifically four, drops of water can be placed on the top surface 201 of the tooth piece 200. A conventional glass or plastic dropper or a dropper bottle can be used to deposit the water drops onto the top surface 201 of the tooth piece 200. If the tooth piece 200 has a concave portion is the center of its top surface 201, the water drops can be beneficially placed in the concave portion. In the instance of the concurrent side-by-side assessment of more than one oral-care products, using, e.g., the apparatus 10 of the type shown in FIGS. 3 and 4, an equal number of identical water drops should be deposited, roughly at the same time, on each tooth piece 200 (e.g., each of the first tooth piece 210 and the second tooth piece 220).

After that, an operator and/or an audience can observe results of the assessment for a fourth period of time, which can last from about 5 seconds to about 120 seconds. If the oral-care product used in the test has adequately sealed the pores in the tooth piece 200 to effectively prevent the water deposited on the top surface 201 of the tooth piece 200 from penetrating the tooth piece 200 throughout its thickness (i.e., from the top surface 201 to the bottom surface 202 of the tooth piece 200)—then the deposited water won't reach the sensor 90 disposed in the tooth station 60, under the bottom surface 202 of the tooth piece 200. Consequently, the sensor 90, in the absence of water interconnecting the contacts, will remain open—and won't activate the sensitivity indicator 80. And the lack of response from the sensitivity indicator 80 will, in turn, indicate that the oral-care product is an effective remedy for decreasing tooth sensitivity by effectively sealing the pores in the tooth piece 200. Conversely, if the water deposited on the tooth piece 200 penetrates, under the forces of gravity, though the thickness of the tooth piece 200 disposed in the tooth station 60 and reaches the sensor 90 located at the bottom of the tooth station 60, the sensor 90 will activate the sensitivity indicator 80, which, in turn, will exhibit at least one response, thereby indicating that the oral-care product failed to seal the pores in the tooth piece 200. The response from the sensitivity indicator 80 will show that the tooth sensitivity remains.

The response indicating sensitivity can be in the form of lights and/or audio signals, as is described herein. For example, rapidly flashing (e.g., red) lights can be combined with an exclamations "ouch!" or "it's painful!" and the like. Light flashing can comprise about 30-120, more specifically about 40-100, and even more specifically about 45-60 flashes per a minute. Any sensory signals that the relevant audience (including cultural and local considerations) commonly associates with symbolic display of warning, discontentment, pain, discomfort, and the like can be used as the sensitivity indication. Such sensory signals may include sound as well, e.g., a short exclamation, message, music (including percussion), and the like.

In the instance of conducting a simultaneous side-by-side comparative assessment of two or more oral-care products, using, e.g., the apparatus having two tooth stations 60, only one of the two oral-care products being tested may exhibit good anti-sensitivity properties based on the oral-care product's ability to seal the pores of the tooth piece after being treated with the oral-care product. Thus, e.g., the first tooth piece 210, treated with a first oral-care product and subjected to water drops, may remain in the tooth station 60 for the fourth period of time (and beyond), exhibiting no signs of water reaching the first sensor 91 and thus no response from the sensitivity indicator 80. At the same time, the second tooth piece 220, treated with a second oral-care product and subjected (simultaneously with the first tooth piece 210) to the same amount of water drops, may exhibit, as soon as, e.g., 7-15 seconds after the water is deposited, signs of water reaching the second sensor 92, thereby triggering the "sensitivity" response from the sensitivity indicator 80. If, e.g., the sensitivity indicator 80 comprises lights configured to illuminate the first area 215 visually associated with the first tooth piece 210 and the second area 225 visually associated with the second tooth piece 220, then the light condition of the first area 215 will not change (no light or existing steady light unchanged), while the light condition of the second area 225 will change (e.g., the light starts flashing and/or the light changes color).

The results of one test can be further validated by additional assessments of the same oral-care products. If the assessment is conducted in several tests, it may be beneficial to assign different operators, one for each test. The oral-care product being assessed can also be tested against any suitable control, e.g., oral-care products known for their desensitizing qualities, as well as negative control substances, such as, e.g., inert compounds.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "25 mm" is intended to mean "about 25 mm."

Disclosure of every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, those skilled in the art will understand that various other changes and modifications can be made without departing from the spirit and the scope of the invention. It is therefore intended to cover in the appended claims all such changes and modifications that are within the scope of this invention.

I claim:

1. A portable tooth-sensitivity demonstration apparatus, comprising:
    a main unit including a top cover having an interior surface and an exterior surface, and a bottom cover opposite to the top cover;
    wherein the top cover comprises at least one tooth station disposed on the exterior surface of the top cover;
    an electrical circuit including a power source, a sensitivity indicator, and an ON/OFF switch;
    at least one sensor disposed in the at least one tooth station and incorporated into the electrical circuit, the at least one sensor being in operative communication with the sensitivity indicator to activate at least one response by the sensitivity indicator,
    the at least one sensor comprising two electrical contacts adjacent to one another and configured to close the electrical circuit upon being connected through an electrically conductive liquid; and
    at least one water-permeable tooth piece configured to be disposed in the tooth station, the at least one tooth piece having a top surface, a bottom surface opposite to the top surface, and an average thickness between the top and bottom surfaces.

2. The apparatus of claim 1, wherein the power source comprises at least one electrical battery.

3. The apparatus of claim 1, wherein the sensitivity indicator comprises at least one LED configured to emit light during the at least one response.

4. The apparatus of claim 3, wherein the light emitted during the at least one response comprises flashing.

5. The apparatus of claim 1, wherein the sensitivity indicator comprises at least one sound device configured to produce a sound during the at least one response.

6. The apparatus of claim 5, wherein the sound produced during the at least one response is selected from the group consisting of siren-like sounds, cacophony sounds, music, human-voice exclamations commonly associated with pain or discomfort, a short comment, and any combination thereof.

7. The apparatus of claim 1, wherein the at least one tooth piece comprises plaster.

8. The apparatus of claim 1, wherein at least a central portion of the top surface of the at least one tooth piece is concave.

9. The apparatus of claim 8, wherein the at least one tooth piece has an average thickness of from about 2 mm to about 5 mm.

10. The apparatus of claim 1, wherein the at least one tooth station comprises a depression in the exterior surface of the top cover, the depressions having a depth of from about 1 mm to about 10 mm.

11. The apparatus of claim 1, wherein the at least one tooth station comprises a first tooth station and a second tooth station disposed at a distance from the first tooth station, wherein the at least one sensor comprises a first sensor disposed in the first tooth station and a second sensor disposed in the second tooth station, and wherein the at least one water-permeable tooth piece comprises a first tooth piece and a second tooth piece substantially identical to the first tooth piece, each of the first and second tooth pieces being configured to fit into any of the first and second tooth stations.

* * * * *